Figure 1:
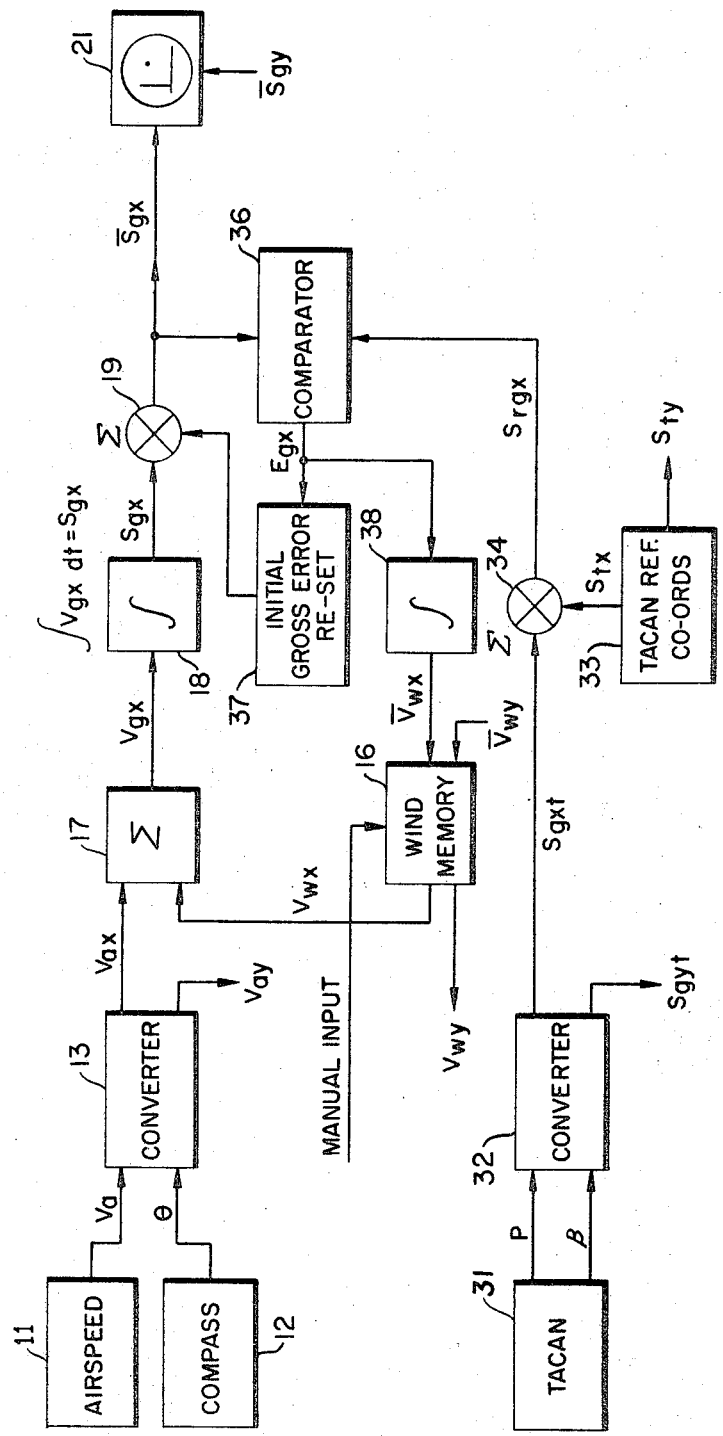

United States Patent

[11] 3,555,250

| | | |
|---|---|---|
| [72] | Inventor | William T. Curran |
| | | Palos Verdes Peninsula, Calif. |
| [21] | Appl. No. | 696,397 |
| [22] | Filed | Jan. 8, 1968 |
| [45] | Patented | Jan. 12, 1971 |
| [73] | Assignee | The Garrett Corporation |
| | | Los Angeles, Calif. |
| | | a corporation of California |

[54] NAVIGATION COMPUTER
8 Claims, 2 Drawing Figs.

[52] U.S. Cl. .................................................. 235/150.27,
235/150.23, 340/24, 343/112
[51] Int. Cl. ...................................................... G06g 7/78,
G01s 7/44
[50] Field of Search ......................................... 235/150.27,
150.26, 150.22; 343/112, 108, 10; 340/23, 24;
73/178

[56] References Cited
UNITED STATES PATENTS

| 3,398,267 | 8/1968 | Hattendorf | 235/150.26 |
| 2,849,184 | 8/1958 | Frederick et al. | 235/150.27 |
| 2,919,856 | 1/1960 | Gray | 235/150.26 |
| 3,007,338 | 11/1961 | Gray et al. | 73/178 |
| 3,021,068 | 2/1962 | Ostroff | 235/150.27X |
| 3,103,579 | 9/1963 | Green | 343/112X |
| 3,194,949 | 7/1965 | Jasperson | 235/150.27 |
| 3,304,551 | 2/1967 | Oki et al. | 343/112 |
| 3,310,982 | 3/1967 | Yamron | 73/178 |
| 3,345,017 | 10/1967 | Olah | 343/108X |

*Primary Examiner*—Malcolm A. Morrison
*Assistant Examiner*—Felix D. Gruber
*Attorneys*—John N. Hazelwood, Albert J. Miller and Orville R. Seidner ABSTRACT: An aircraft navigation computer that computes the wind velocity during flight and uses the last measured wind velocity to compute the craft's position when out of range of landmark.

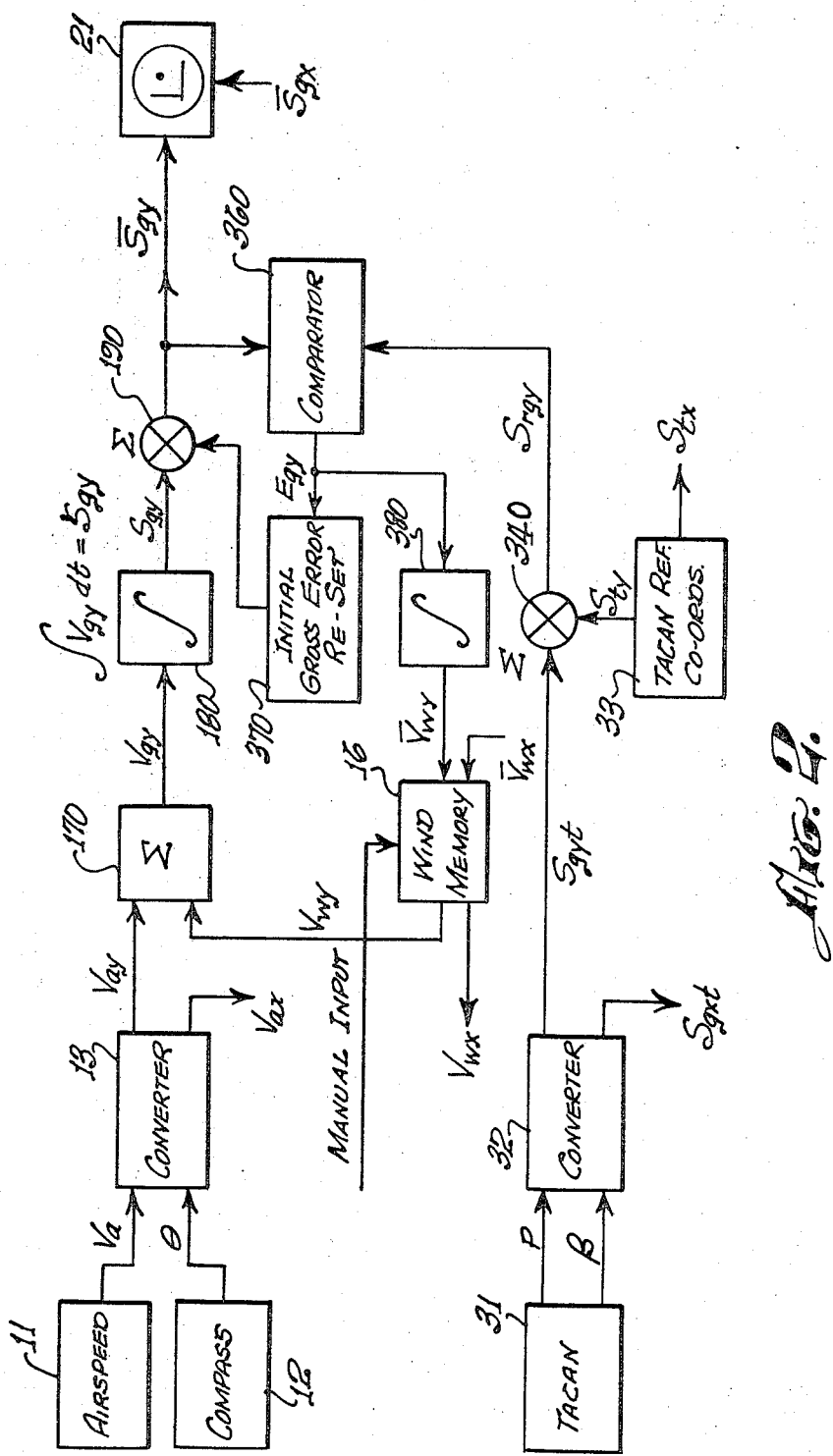

NAVIGATION COMPUTER

This invention relates to a computer and, more particularly, to an aircraft computer for computing a continuous, more accurate position.

An object of this invention is to produce a more efficient, economical, and simplified aircraft navigation computer for computing the aircraft's position.

A feature of this invention is the ability of the computer to find the error between a dead reckoning position and the actual position and to calculate the present wind velocity from the error.

Another feature of this invention is the ability of storing the newly calculated wind velocity and using this stored value in combination with the craft's air speed and heading to calculate the craft's position.

Another feature of this invention is the ability to continuously display and calculate a more accurate position of the craft even when the craft is out of range of landmarks.

These and other objects and advantages and characterizing features of this invention will become apparent from the ensuing detailed description of the illustrative embodiment thereof, reference being made to the accompanying drawings wherein block diagrams illustrate the novel process for computing wind velocity and dead reckoning position.

Referring to FIG. 1 of the drawings, the air speed and heading of the aircraft are known, since these are available from present aircraft instruments, for example, a speedometer 11 and compass 12, respectively. The air speed is readily converted by known means to a voltage signal $V_a$ representing the aircraft's air speed and the heading is readily converted to a voltage signal $\theta$ representing the aircraft's angle of flight, for example, with a line running due North and South, measured clockwise. These two known signals are fed to a converter 13 that produces two signals $V_{ax}$ and $V_{ay}$. Signal $V_{ax}$ represents, for example, the craft's air velocity component in the East-West direction and signal $V_{ay}$ represents, for example, the craft's air velocity component in the North-South direction. Signal $V_{ax}$ is equal to signal $V_a$ times the sine of the angle represented by signal $\theta$, and signal $V_{ay}$ is equal to signal $V_a$ times the cosine of the angle represented by signal $\theta$. Converter 13 performs this function in a manner well known in the art. In this application the term speed is a scalar quantity having size and no direction and the term velocity is a vector having size and direction.

The drawing shows on FIG. 1 the block circuit that processes the aircraft's velocity component in the East-West direction represented by signal $V_{ax}$ to give the craft's longitudinal position. However, a similar block circuit, which is shown on FIG. 2, is available to process the aircraft's velocity component in the North-South direction in terms of a signal $V_{ay}$ to give the craft's latitudinal position. In addition to knowing the aircraft's air speed and heading, the wind velocity should be known so that the two could be added vectorially to produce the true ground speed. However, the wind velocity changes and this change is impossible to detect in a moving aircraft unless external aid is employed which, up to now, has not been satisfactory. Normally, the wind velocity at the time of take off is recorded in an aircraft so that the pilot at least knows the wind velocity right after take off. This invention also provides a wind memory 16 for this purpose. The wind memory 16 stores the wind velocity, for example, as two signals $V_{wx}$ and $V_{wy}$ which represent the components of the wind velocity in the East-West direction and in the North-South direction respectively. Signals $V_{ax}$ and $V_{wx}$ are added together in a summing circuit 17 to produce a signal $V_{gx}$ representing the ground velocity component of the aircraft in the East-West direction. Signal $V_{gx}$ is coupled into an integrating circuit 18 where the signal is integrated with respect to time. Circuit 18 produces a voltage signal $S_{gx}$ in response to the integration of signal $V_g$. Signal $S_{gx}$ represents the dead reckoning position of the aircraft in the East-West direction. Signal $S_{gx}$ is coupled through a summing circuit 19 which produces a signal $\overline{S}_{gx}$ that is normally the same value as $S_{gx}$ as will be explained hereinafter. Since the other block circuit illustrated on FIG. 2 produces related signals $V_{gy}$, $S_{gy}$, and $\overline{S}_{gy}$, the dead reckoning position of the aircraft could be shown as a point on a display, for example, an oscilloscope 21.

As mentioned above, the wind velocity constantly changes and consequently the dead reckoning position of the aircraft would probably not be the same as the true position of the aircraft. The true position of the aircraft could be obtained by computing the aircraft's range and azimuth from a fixed point on earth, such as a Tacan station 31. Tacan stations are well known two dimensional navigational systems which provide radio signals from which an aircraft is able to compute the range and azimuth from the aircraft to the station. The true ground position is calculated in the following manner. From the fixed point on earth such as the Tacan station, the navigator with the use of suitable equipment could calculate signals $P$ and $\beta$ representing range and azimuth angle from the aircraft to the Tacan station 31. The signals $P$ and $\beta$ are coupled to a converter 32 that produces signals $S_{axt}$ and $S_{ayt}$ representing the distance between the aircraft and the Tacan station in the East-West and the North-South directions, respectively. Signal $S_{axt}$ is equal to signal $P$ times the sine of the angle represented by signal $\beta$ and signal $S_{ayt}$ is equal to signal $P$ times the cosine of the angle represented by signal $\beta$. To these signals are algebraically subtracted the signals representing the coordinates of the particular Tacan station as obtained from a suitable Tacan memory 33. The coordinates of the Tacan station are represented by signals $S_{tx}$ and $S_{ty}$, and are subtracted from signals $S_{axt}$ and $S_{ayt}$, respectively, in a suitable circuit, for example, circuit 34 that produces signal $S_{rgx}$ which is the true coordinate of the aircraft in the East-West direction from the referenced coordinate system. Signal $S_{rgx}$ and the dead reckoning signal $\overline{S}_{gx}$ are compared in a comparator circuit 36 to produce an error signal $E_{gx}$ which is the difference between the two signals, and normally is very small. However, very often the smaller aircrafts may be out of range of a Tacan station for some time. Then, when the craft approaches a Tacan station the error signal $E_{gx}$ may be quite large. If the error signal $E_{gx}$ is above a given value, the relatively high value error signal preferably passes through an initial gross error circuit 37 and is added to signal $S_{gx}$ to make signal $\overline{S}_{gx}$ represent the true ground position as rapidly as possible. However, if the value of signal $E_{gx}$ is relatively low or below the given value circuit 37 blocks signal $E_{gx}$ from the adding circuit 19. Under this condition, the dead reckoning position has to be determined by calculating a new wind velocity for the memory 16. The gross error circuit 37 is a standard circuit that blocks voltage levels below a given value and passes voltage above the given value.

The new wind velocity is found by adding the error signal to the wind signal in the wind memory. The sign of the error signal $E_{gx}$ determines whether to increase or decrease the stored wind signal component $V_{wx}$. Error signal $E_{gx}$ could be directly added to signal $V_{wx}$ increasing or decreasing this signal as required. However, in this embodiment, the signal $E_{gx}$ is preferably integrated by a circuit 38 to produce an error velocity signal $\overline{V}_{wx}$ which is added to the stored signal to provide an output voltage corresponding to the corrected wind velocity signal $V_{wx}$. The function of circuit 38 is to correct the wind velocity signal as rapidly as possible, because when signal $E_{gx}$ is large, signal $\overline{V}_{wx}$ increases more rapidly than when signal $E_{gx}$ is small. In addition, if signal $E_{gx}$ fluctuates due to, for example, unsteady winds and turbulence signal $\overline{V}_{wx}$ will be an average value thereby smoothly changing the value of the stored wind memory.

The same total operations are performed by the block circuit of FIG. 2 to determine the true North-South position and to calculate the new value of the North-South wind component. Thus, the aircraft velocity signal $V_{ay}$ from the converter 13 is summed in the summing circuit 170 with the wind signal $V_{wy}$ from the wind memory 16 to produce the combined signal $V_{gy}$ which is integrated timewise in the integrating circuit 180 to produce the position signal voltage $S_{gy}$ which corresponds to the North-South dead reckoning position in the same manner that $S_{gx}$ corresponds to the East-West dead reckoning position.

To the signal voltage $S_{gy}$ is added algebraically in the summing circuit 190 the North-South error signal, if any, from the initial gross error circuit 370 to produce the voltage signal $\bar{S}_{gy}$ which represents the true ground position and is adapted for utilization by the display oscilloscope 21.

As was the case with the East-West component signal of the wind velocity $V_{wx}$, the North-South component signal $V_{wy}$ supplied to the summing circuit 170 by the memory circuit 16 is continuously corrected, in this case by the algebraic addition thereto of the integrated error signal $\bar{V}_{wy}$. This signal voltage is obtained from the integrating circuit 380 whose input is the error signal voltage $E_{gy}$ obtained from the comparator circuit 360. Circuit 360 has inputs of the aforesaid true ground position or corrected dead reckoning signal voltage $\bar{S}_{gy}$ and the true aircraft coordinate signal $S_{rvv}$ supplied by the summing circuit 340. The converter 32 supplies the North-South range signal $S_{out}$ to the summing circuit 340, to be combined therein with the TACAN North-South coordinate signal $S_{tv}$.

The novel circuit readily calculates the wind velocity whenever the aircraft is within range of a Tacan station. When the craft is out of range the new wind velocity is used to calculate the dead reckoning ground position. The calculated wind velocity is more accurate than would be obtained from meteorological reports. The novel computer always uses the last updated wind velocity to calculate the dead reckoning position. Naturally, when a Tacan station is out of range signals $S_{rvx}$ and $S_{rvy}$ are inhibited, for example, by a validity signal generated in the Tacan receiver and well-known means (not shown) are provided to prevent the stored wind data from being changed.

In light of the above teachings, various modifications and variations of the present invention are contemplated and will be apparent to those skilled in the art without departing from the spirit and scope of the invention. Therefore, the invention is not limited to the exemplary apparatus or procedures described, but includes all embodiments within the scope of the claims.

I claim:

1. In a navigation computer for a moving aircraft:
   a. input first signal means arranged for coupling to signal sources providing signals corresponding to air speed and compass heading of the aircraft, and with an output adapted to provide signals representing a component of the velocity of the aircraft;
   b. memory means arranged for receiving and storing input data corresponding to wind velocity, and with an output adapted to provide signals representing a component of said wind velocity;
   c. signal combining means coupled to the outputs of said first signal means and said memory means, and with an output adapted to provide first signals representing a dead reckoning position of the aircraft;
   d. input second signal means arranged for acquiring signals corresponding to the range and direction of the aircraft from a fixed ground position, and with an output adapted to provide second signals representing true ground position of the aircraft;
   e. signal comparing means coupled to the outputs of said signal combining means and said second signal means to provide error signals representing the deviation of said first signals from said second signals; and
   f. circuit means coupling said comparing means with said memory means for changing the stored wind velocity in said memory means in response to said error signals.

2. In the computer of claim 1 wherein means are included for changing the signal representing the dead reckoning position in response to the error signal and then displaying the changed signal.

3. In the computer of claim 1 wherein said means for combining includes means for vectorially adding the stored wind velocity and the aircraft's air speed and heading to produce a signal representing the aircraft's ground velocity, and includes means for integrating the signal representing the aircraft's ground velocity to produce a signal representing the dead reckoning position.

4. In the combination of claim 1 wherein:
   said means for storing, stores the wind velocity as two signals representing two velocity components of the wind velocity; and
   said means for combining includes means for converting the air speed and heading into two signals representing two air velocity components that are oriented in the same two directions as the wind velocity components, and includes means for separately combining the corresponding components of the stored wind and air speed to produce the dead reckoning position.

5. In the combination of claim 4 wherein said means for separately combining includes means for first adding the signals representing the same components in the same directions and then integrating the results to obtain the dead reckoning position.

6. In the combination of claim 4 wherein said means for separately combining includes means for first integrating the signals and then adding the integrated signals representing the same components to obtain the dead reckoning position.

7. In the combination of claim 4 wherein:
   said means for computing the range and direction that the aircraft is from said fixed ground position produces a signal that represents one of said components of the true ground position and another signal representing the other of said components of the true ground position;
   said means for comparing the corresponding components of the dead reckoning position and the true position to produce error signals for each component; and
   said means for changing the stored wind velocity responds to both error signals.

8. In the combination of claim 7 wherein means are included for changing each signal component representing the dead reckoning position to response to the corresponding component error signal when the error signal is above a given value and then displaying both changed signals which represent the aircraft's true ground position.